US011319185B2

(12) United States Patent
Sonnenmoser et al.

(10) Patent No.: US 11,319,185 B2
(45) Date of Patent: May 3, 2022

(54) ELEVATOR SYSTEM HAVING A CENTRAL CONTROL UNIT AND A PLURALITY OF FIELD DEVICES WHICH COMMUNICATE VIA A SUMMATION FRAME METHOD

(71) Applicant: Inventio AG, Hergiswil (CH)

(72) Inventors: Astrid Sonnenmoser, Hochdorf (CH); David Michel, Rotkreuz (CH); Frank Olivier Roussel, Lucerne (CH); Ivo Lustenberger, Buttisholz (CH); Kurt Heinz, Buchs (CH); Thomas Hartmann, Kleinwangen (CH); Martin Hess, Baar (CH)

(73) Assignee: INVENTIO AG, Hergiswil NW (CH)

( * ) Notice: Subject to any disclaimer, the term of this patent is extended or adjusted under 35 U.S.C. 154(b) by 885 days.

(21) Appl. No.: 16/085,627

(22) PCT Filed: Mar. 28, 2017

(86) PCT No.: PCT/EP2017/057262
§ 371 (c)(1),
(2) Date: Sep. 17, 2018

(87) PCT Pub. No.: WO2017/167720
PCT Pub. Date: Oct. 5, 2017

(65) Prior Publication Data
US 2019/0119067 A1    Apr. 25, 2019

(30) Foreign Application Priority Data
Mar. 30, 2016    (EP) .................................. 16163020

(51) Int. Cl.
*B66B 1/34*    (2006.01)
*H04L 12/423*    (2006.01)
(Continued)

(52) U.S. Cl.
CPC .......... *B66B 1/3423* (2013.01); *B66B 1/3446* (2013.01); *B66B 5/0031* (2013.01); *B66B 13/22* (2013.01); *H04L 12/423* (2013.01)

(58) Field of Classification Search
CPC ... B66B 1/3423; B66B 1/3446; B66B 5/0031; B66B 13/22; H04L 12/423
See application file for complete search history.

(56) References Cited

U.S. PATENT DOCUMENTS

2009/0299503 A1    12/2009    Oster et al.

FOREIGN PATENT DOCUMENTS

EP    0755012 A2    1/1997
EP    2251293 A1    11/2010
(Continued)

*Primary Examiner* — Jeffrey Donels
(74) *Attorney, Agent, or Firm* — William J. Clemens; Shumaker, Loop & Kendrick, LLP

(57) ABSTRACT

An elevator system has a central control unit for generating control signals and/or processing sensor signals and controlling functions of the system, a plurality of field devices distributed inside a structure accommodating the system, preferably along an elevator shaft, and a field bus system for interchanging the signals between the control unit and the field devices. Each field device outputs sensor signals generated by a sensor and/or receives control signals to be implemented by an actuator. Data packets including the signals are interchanged in a serial manner between the control unit and all field devices in a summation frame method using a closed ring topology. Each field device has a driver to insert the sensor signals into the data packet or to remove the control signals from the data packet. Data and signal transmission is thereby carried out quickly and safely in a safety circuit of the elevator system.

14 Claims, 5 Drawing Sheets

(51) Int. Cl.
*B66B 5/00* (2006.01)
*B66B 13/22* (2006.01)

(56) References Cited

FOREIGN PATENT DOCUMENTS

EP 2961106 A1 12/2015
WO 2011001197 A1 1/2011

5 ELEVATOR CAR
7 COUNTERWEIGHT
11 DRIVE MOTOR
13 CENTRAL CONTROL UNIT
17 FIELD DEVICE
19 DOOR SWITCH
23 MONITORING SWITCH
31 SAFETY MONITORING
  UNIT

ELEVATOR SYSTEM HAVING A CENTRAL CONTROL UNIT AND A PLURALITY OF FIELD DEVICES WHICH COMMUNICATE VIA A SUMMATION FRAME METHOD

FIELD

The present invention relates to an elevator system in which a plurality of field devices, such as door switches, safety switches, or the like, which communicate with a central control unit, are provided in an elevator shaft.

BACKGROUND

Elevator systems are generally used to be able to convey people between different floors inside a structure for example. For this purpose, in general an elevator car can be moved inside a usually vertical elevator shaft. When the elevator car has reached a desired floor, an elevator door, and optionally together therewith an associated floor door, can be opened in order to allow people to access the elevator car and/or to leave the elevator car.

Functions of the elevator system, such as actuation of the drive thereof that moves the elevator car, are usually controlled by a central control unit. In the process, the central control unit can for example take into account information that it can obtain by processing sensor signals. The functions of the elevator system can also be controlled by more than one control unit, for example by one control unit that inter alia actuates the drive, and a further control unit that monitors the safety functions. In the following, a central control signal is to be understood to mean every control unit that processes sensor signals and/or generates sensor signals. The sensor signals may in particular originate from devices such as door switches or other safety switches that are arranged in a distributed manner in the structure which accommodates the elevator system. Devices of this kind will be referred to as field devices in the following. Moreover, the control unit may itself generate control signals and transfer said signals to other devices that are arranged in a distributed manner inside the structure and that may for example comprise actuators that implement the control signals. Devices of this kind, too, will be referred to as field devices in the following.

EP 2 251 293 A1 describes a conventional elevator control means comprising a field bus interface.

WO 2011/001197 A1 describes an elevator control means that communicates with a plurality of field devices via a CAN bus.

Since correct control of the functions of the elevator system is in general essential for the safety of the elevator system, there may be a need for an elevator system in which communication between a central control unit and a plurality of field devices of the elevator system can be carried out quickly and reliably. Furthermore, there may be a need to design an elevator system such that the control unit thereof and the field devices thereof can be installed and/or serviced in a simple and/or cost-effective manner.

SUMMARY

Such a need can be addressed by an elevator system according to the following description.

One aspect of the present invention relates to an elevator system that comprises a central control unit, a plurality of field devices, and a field bus system. The central control unit is designed to generate control signals and/or to process sensor signals and to control functions of the elevator system. The field devices are arranged in a distributed manner inside a structure which accommodates the elevator system, in particular preferably along an elevator shaft. Each field device is set up to input sensor signals generated by a sensor and to output said signals on a field bus, and/or to receive, via a field bus, control signals to be implemented by a connected actuator. In this case, a sensor and/or an actuator may be integrated in the field device or may be arranged externally and connected to the field device so as to be capable of signal transmission. The field bus system is designed having a topology of electrical lines for interchanging sensor signals and/or control signals between the central control unit and the field devices. In this case, the field devices, the central control unit, and the field bus system are specifically designed to interchange a data packet comprising the sensor signals and/or control signals in a serial manner between the central control unit and all field devices in what is known as a summation frame method using a closed ring topology. Each of the field devices has a driver in order to insert the sensor signals into the data packet or to remove the control signals from the data packet. It is also possible for a further control unit, in addition to the central control unit, to be incorporated into the field bus system, which further control unit does not output sensor signals and does not receive control signals, but likewise evaluates sensor signals and optionally generates control signals.

Possible features and advantages of embodiments of the invention may be considered, among others and without limiting the invention, to be dependent upon the concepts and findings described below.

As briefly mentioned by way of introduction, conventional elevator systems usually already have a plurality of field devices that are designed to detect operating states of the elevator system using a sensor and/or to influence said states using actuators. Said field devices are usually constructed in a simple manner. For example, simple door switches could be provided in order to identify whether an elevator door or a floor door is currently open or closed. In this case, the door switches act as sensors that generally have just two states; open or closed. In addition to door switches of this kind, a plurality of other sensorially acting field devices may be provided in an elevator system, for example in order to be able to determine whether a rope-like bearing means of the elevator system is currently mechanically tensioned or is slack (known as a slack rope switch), whether auxiliary equipment such as ladders have been correctly put away in the elevator shaft, etc.

In particular sensors and switches that monitor the safety of the elevator system may be interconnected in what is known as a conventional or classic safety circuit of the elevator system. For example, door switches and other sensors that monitor safety may be interconnected in a serial manner. In such a case, the safety circuit is fully closed only when all the door switches are closed for example. The information associated therewith, that all floor doors and elevator doors are closed, can thus be easily guided by the safety circuit to the central control unit which can thereupon authorize and control a movement of the elevator car using the drive of the elevator system for example. As soon as at least one door switch opens, and thus indicates that a floor door or elevator door is not fully closed, the entire safety circuit is opened and the central control unit then prevents further movement of the elevator car by appropriately actuating the drive.

However, when using conventional door contacts that sense only binary states, for example within a conventional safety circuit, it is generally not possible to identify which floor or elevator door has currently been opened and thus the door switch there has been moved into its open state. It is also not possible to distinguish whether the safety circuit was opened for example because one of the door switches was moved into its open state, or whether this has occurred for example because a ladder that is to be stored in the elevator shaft was not correctly put away and therefore the safety switch there, which is also part of the safety circuit, is still open.

Accordingly, when using such "simply designed" switches, sensors, or other field devices in conventional safety circuits it is not possible, for example, to decide in a case-specific manner how to react to a break in the safety circuit. While, for example in the case of a ladder that has not been correctly put away, movement of the elevator car at least in regions of the elevator shaft remote from said ladder may still be entirely permissible, travelling operation of the elevator system should be stopped immediately in the case of a floor door not being correctly closed.

Error analysis in the event that one of the switches or other field devices contained in a safety circuit may be faulty, for example, may prove difficult and time-consuming in the case of simply designed field devices in conventional safety circuits because it may be the case that all the field devices have to be inspected.

It has thus been found to be advantageous to design field devices for use in elevator systems so as to be "more intelligent" or to connect said devices to and to allow said devices to communicate with one another and with a control unit in a more intelligent manner.

For example, in the event of a field device being intended to output sensor signals from a sensor, the field devices may be designed to provide the sensor signals or to insert said signals into the data packet in such a way that said signals identify the sensor. In the event of a field device being intended to receive control signals to be implemented by an actuator, the field device may be designed to gather and evaluate, from the data packet, control signals that identify the actuator.

In other words, it is possible that a field device that outputs sensor data may not simply "dumbly" generate the sensor data and pass said data to a control unit, but instead the field device may generate the sensor data in such a way and/or forward said data to the control unit such that the control unit can identify from which of the plurality of field devices said specific data originate. For this purpose, the field device may insert the data into the data packet of the summation frame at a position specific for the particular field device for example, such that the control unit can identify the field device from which said sensor data originate on the basis of the position at which the sensor data are located in the data packet. Alternatively or in addition, the field device may provide or modify the sensor data in a manner unique to said particular field device, such that the control unit can identify from which field device particular data originate on the basis of the type and form of the sensor data.

Similarly, control data may be integrated into the data packet at a position and/or in such a way that a field device that gathers and evaluates said control data can identify that specific control data contained in the data packet of the summation frame have been provided specifically for this particular field device.

Providing such a possibility for identifying individual field devices to or authenticating said field devices with the control unit can in general allow both for case-specific action or reaction and for simplified error analysis.

A particular field device from which sensor data originate or to which control data are to be delivered can be identified on the basis of a position at which the sensor data or control data are accommodated in the data packet. In this case, every possible position should be uniquely associated with one of the field devices.

Alternatively, the signals that identify the sensor or the actuator may for example be an identification code that is to be uniquely assigned to a field device and that may, for example, be stored in the field device itself and if necessary read out by the field device and/or forwarded to the control unit.

For example, the field devices may be designed so as to generate further signals, in addition to the sensor signals, or so as to gather and evaluate further signals in addition to the control signals. In other words, it is possible for a field device acting as a sensor to not only generate and forward to the central control unit its sensor signals, but in addition to also generate other signals that allow a case-specific reaction or an error analysis for example. Similarly, field devices that are provided with actuators could also gather and evaluate further signals in addition to the control signals, for example in order to be able to be addressed specifically by the control unit or to be able to carry out case-specific actions for example.

The use of "more intelligent" field devices or the intelligent incorporation thereof in a field bus system can also be advantageous with regard to the fact that elevator systems are increasingly used in ever larger buildings, and in this case for example ever higher safety requirements need to be med. On account of the size of such elevator systems, a large number of field devices must be provided therein, which devices have to be reliably monitored. In particular in the case of malfunctions, it may be difficult to identify faulty field devices when there is such a large number of field devices. Moreover, in a spatially large elevator system, the field devices often have to be connected to the central control unit over great distances, and it must be possible to reliably transmit the sensor signals or control signals of said devices over great distances.

Therefore, in modern elevator systems, field bus systems may be provided in which a topology of electrical lines is used to interchange sensor signals and/or control signals between the control unit and the field devices. Field bus systems of this kind are generally physically highly developed bus systems that have been developed in particular for automation, manufacturing, building automation, and/or automotive technology. These are usually wired, series bus systems by means of which field devices can be connected to control units or what are known as process computers, and via which quick data exchange can take place between the components. In this case, the field buses usually operate in a master/slave operating mode, in which a control unit in the form of a master station takes over the control of processes and protocols, and one or more field devices in the form of slave devices take over processing of tasks.

With reference to elevator systems, the field bus system may be designed for example to appropriately forward to field devices control signals generated by the control unit, in order that said field devices can pass the control signals there to actuators that implement the control signals. Alternatively or in addition, the field bus system may be set up to receive sensor signals from field devices that comprise an integrated sensor or that are connected to an external sensor, and to appropriately forward said signals to the central control unit.

The field bus system may in addition be designed to forward test signals for testing the functionality of individual field devices for example.

Field bus systems may differ in particular in respect of the topology thereof, the media they use for signal transmission, and the transmission protocols they use. Inter alia, a distinction is made between message-oriented methods and what is known as the summation frame method. Moreover, usable topologies are differentiated into ring topologies, tree topologies, bus topologies, or star topologies.

It has now been found, in an obvious manner, that, for use in elevator systems, field bus systems and associated field devices or the associated central control unit are advantageously implemented using a closed ring topology and should be designed to interchange data packets comprising the sensor signals and/or control signals in a serial manner between the central control unit and all field devices in a summation frame method. In this case, each of the field devices should be capable, using a driver, to individually insert into the data packet the sensor signals it is to deliver or to individually remove from the data packet the control signals it is to implement. A data packet to be transmitted within the context of a data transmission protocol that is designed accordingly is also referred to as a summation frame, since a sum of signal data of a plurality of field devices are combined in a common data packet therein.

In this context, the summation frame method can be understood to be a method in which the central control unit and all the field devices that are connected to sensors or actuators are interconnected in a logical ring topology, and a data flow occurs in one direction, similarly to the case of a shift register. In this case, the data are shifted in succession through the entire ring, from subscriber to subscriber. In this case, a data packet or a data block to be transmitted obtains the data or signals for all the field devices and preferably has a relatively low overhead consisting of a loopback, the actual sensor or actuator data, and an optional checksum field. A data packet or data frame of this kind that contains all subscriber data is referred to as a summation frame. In this case, the summation frame typically begins with the loopback. When this has been shifted through the entire ring and is present in the receiving register of the control unit, all the subscriber data, i.e. in the present case all the data of the field devices of the elevator system, are in the central control unit. A handover pulse can synchronize handover of the subscriber data to the relevant actuators or the transfer of the sensor data from the relevant sensors into the shift register ring.

Using a ring topology in the field bus system implemented, and using the summation frame method, make it possible to keep a response time short in the case of elevator systems, in particular when implementing safety-relevant tasks for example. For example, a time duration between a timepoint at which a door contact, acting as a field device, detects that a floor door is being opened, and a timepoint at which this information is forwarded to the central control unit and can be appropriately processed there, can be kept very short. Failures or faults in individual subscribers of the field bus system, i.e. in individual field devices incorporated in the ring topology, can also be identified quickly and preferably in a device-specific manner.

According to one embodiment, the field devices are arranged one behind the other in a sequence. For example, the field devices may be arranged so as to be spatially one behind the other in a sequence along the elevator shaft. The field devices may, however, be interconnected one behind the other in sequence only with respect to a signal transmission path, the signal transmission-related arrangement of this kind not necessarily needing to correlate to a spatial arrangement of the field devices. In this case, the plurality of field devices is divided into two groups. Each group comprises at least one field device. On an outbound path of the ring topology, proceeding from the control unit as far as a field device that is arranged furthest from the control unit, only the field devices of the first group are incorporated into the ring topology such that the data packet is supplied to the drivers thereof. In contrast, the field devices of the second group are incorporated into the ring topology not on the outbound path but instead on a return path of the ring topology proceeding from the field device arranged furthest from the control unit, to the control unit, such that the data packet is supplied to the drivers thereof.

In other words, field bus system, having its ring topology and the field devices received therein, should be designed such that at least one or some field devices are incorporated into the ring topology on an outbound path to a field device that is spatially furthest from the control unit and the drivers thereof can receive the control data associated therewith or can pass on the sensor data thereof, while at least one or some other field devices are incorporated into the ring topology only on a return path from said remotest field device back to the control unit and the drivers thereof can remove corresponding signals from the transferred summation frame data packet or insert corresponding signals therein.

This embodiment is based on the consideration that physical signal path lengths within the ring topology of the field bus system should if possible be of similar dimensions between all the subscribers of said ring topology.

It is therefore necessary to avoid for example all the field devices being integrated into the ring topology on an outbound path from the central control unit to the spatially remotest field device, and being able to receive or output the signals by means of their drivers. In such a case, a data path within the ring topology from the remotest field device back to the central control unit would be very long. Data transmission back to the central control unit through a correspondingly long return wire would place significantly higher requirements on the driver components, for example in respect of the power thereof, the required edge steepness and edge detection, the design of the connection lines, for example in respect of cable impedance, termination, and crosstalk behavior, than data transmission between other field devices that are closely adjacent. Driver components and connection lines that meet higher requirements are generally more expensive than driver components and connection lines that have to meet less stringent requirements. In this case, "adjacent" field devices is to be understood to mean field devices that are adjacent spatially or locally. Since complete data transmission through the ring topology takes place in a serial manner however, such a long data transmission between just two subscribers of the ring topology would significantly slow the entire data transmission rate within the field bus system.

It is therefore proposed to assign at least one or some of the total number of field devices provided in the elevator system to a second group, and to integrate said second group into the ring topology only on the return path of the topology, from the field device arranged furthest from the control unit back to the control unit. Distances between individual subscribers of the ring topology, i.e. lengths of data transmission paths between adjacent field devices or between one field device and the central control unit can thus be made more or less uniform. A clock speed when transmitting signals within the ring topology can then be increased accordingly.

According to a specific embodiment, the first group of field devices comprises just every second field device on the path of the ring topology from the control unit to the field device arranged furthest from the control unit. In particular, the first group of field devices comprises a field device arranged so as to be directly adjacent to the control unit and, proceeding therefrom, every next but one field device in the ring topology.

In other words, field devices located between the central control unit and the field device arranged furthest therefrom are assigned alternately to the first and the second group of field devices. Adjacent field devices therefore belong to different groups. In other words, the field devices are incorporated into the ring topology so as to be distributed on an outbound path and a return path of the ring topology, such that the driver of only every second field device receives a data packet on an outbound path from the central control unit to the field device arranged furthest therefrom, whereas the driver of every second other field device is incorporated into the ring topology on a return path. A path length between two field device drivers are incorporated into the ring topology, which length is to be bridged during signal transmission, can be largely made uniform and minimized in this manner. This allows for high clock speeds during signal transmission within the ring topology. Signal transmission rates can be maximized in this manner.

According to an embodiment, each field device comprises at least one first, one second, one third, and one fourth electrical terminal. In this case, in the field devices, the driver is electrically connected to the first terminal and to the fourth terminal, and the second terminal is electrically connected to the third terminal for direct feedthrough. In this case, in the field devices of the first group, the driver is designed to receive the data packet via the first terminal and to output the data packet via the fourth terminal, whereas, in the field devices of the second group, the driver is designed to receive the data packet via the fourth terminal and to output the data packet via the first terminal. The first and the second terminal of a field device that is spatially closest to the control unit are connected to terminals of the control unit. In each field device with the exception of the field device arranged spatially furthest from the control unit, the third terminal is electrically connected to the first terminal of a directly adjacent field device, and the fourth terminal is electrically connected to the second terminal of the directly adjacent field device. In the case of the field device arranged furthest from the control unit, the third terminal is connected to the fourth terminal of the same field device in an electrically shorting manner.

As can be seen more clearly later, in the description of preferred embodiment with reference to the accompanying drawings, this means, in other words, that all the field devices integrated into the ring topology of the field bus system may be constructed in the same manner with respect to the terminals to be provided thereon, and adjacent field devices may also be electrically interconnected in the same manner. In particular, there is no need for twisting or interlacing in the case of the cables that establish the electrical connection between adjacent field devices. This can significantly simplify installation of the field devices and the electrical connections between the field devices, and minimize a risk of incorrect wiring.

In this case, however, the drivers to be provided in the field devices and/or an arrangement of the drivers of the field devices of the first group of field devices could or should differ from those of the field devices of the second group of field devices. Although the drivers are in each case provided between the first and the fourth terminal of the field device, a direction from which the drivers receive the data packet and in which the drivers are intended to output the data packet differ. Whereas, in the field devices of the first group, the drivers are designed to receive the data packet via the first terminal and to output said data packet via the fourth terminal, exactly the reverse is the case in the field devices of the second group.

In order to prevent, for example, the need for field devices that are different in terms of hardware to be provided for the elevator system, which would increase production and logistics complexity, according to one embodiment the field devices can be designed to adjustably reverse a data transmission direction of the drivers thereof. In other words, suitable technical provisions can be made on a field device which can cause the driver of the field device to receive signals from the first terminal and pass said signals to the fourth terminal, with the result that the field device belongs to the first group of field devices, or can cause the driver to receive signals from the fourth terminal and to output said signals at the first terminal, with the result that the field device belongs to the second group of field devices.

For example, the field devices may comprise switches in order to adjust the data transmission direction of their drivers. Switches of this kind may be provided as DIP switches for example, which are attached to a circuit board integrated in the field device in order to be able to switch the data transmission direction of the associated driver into one or the other direction, as required. Alternatively, the switches may also be implemented in the form of jumpers.

Field devices or the drivers thereof may possibly also be designed to automatically identify a direction in which the sensor data are intended to be forwarded or from which the control data are intended to be received, and to be able to automatically modify the data transmission direction thereof accordingly.

According to an embodiment, the drivers of a field device may be provided on a circuit board, and the electrical connections between the drivers and the first to fourth terminals may occur in this case via conductive tracks of the circuit boards. In other words, the drivers may be formed as correspondingly specialized components for example. Electrical terminals of the drivers can then be connected, via conductive tracks of a circuit board that carries the relevant component, with the first to fourth terminals of the field device that are accessible from the outside, such that the driver of a field device can be electrically connected to a correspondingly cabled adjacent field device, by means of said terminals that are accessible from the outside. In this case, a data transmission direction in which the driver receives signals either from the first or from the fourth terminal and accordingly passes said signals to the fourth or first terminal, respectively, can be implemented in a simple manner by appropriately configuring the conductive tracks on the circuit boards.

According to another embodiment, each field device again comprises at least one first, one second, one third, and one fourth electrical terminal. However, unlike in some of the embodiments described above, in this case the field devices of the first and the second group do not necessarily differ from one another. Instead, both in the field devices of the first group and in the field devices of the second group, the driver may be electrically connected to the first terminal and to the third terminal and may be designed to receive the data packet via the first terminal and to output the data packet via the third terminal. In this case, the second terminal is electrically connected to the fourth terminal for direct feedthrough. In this case, the first and the second terminal of a field device that is closest to the control unit are connected to terminals of the control unit. In this case, each field device of the first group which is connected to an adjacent field device of the second group is connected by means of its third terminal to the fourth terminal of the adjacent field device, and by means of its fourth terminal to the third terminal of the adjacent field device, and/or by means of its first terminal to the second terminal of the adjacent field device, and by means of its second terminal to the first terminal of the adjacent field device.

In other words, in this embodiment the field devices to be used in the elevator system may all be designed so as to be the same, i.e. the field devices of the first group and the field devices of the second group may be designed identically. However, in order for it to be possible for the field devices of the first group to be incorporated into the ring topology on the outbound path from the control unit to the remotest field device, while the field devices of the second group are incorporated on a corresponding return path of the ring topology, corresponding electrical connections between adjacent field devices of different groups are designed so as to be crossed or interlaced.

Production and logistics when providing field devices can therefore be simplified, since just one type of field device needs to be provided. However, wiring adjacent field devices within the ring topology may be more complex and must be carried out carefully, since it may be necessary to take account of the configuration in which adjacent field devices are wired to one another. This may lead to increased wiring complexity in particular when further wiring, for example for supplying power to field devices, is intended to be provided in addition to cabling for connecting the first to fourth signal-transmitting terminals, and adjacent field devices are intended to be electrically connected by means of standardized plugs.

According to one embodiment, the field devices form parts of a safety circuit of the elevator system. Rapid and reliable signal transmission is often particularly necessary in a safety circuit of an elevator system, and therefore the use and specific adaptation of the field bus system proposed here having a ring topology and a summation frame method to be implemented therein can be particularly advantageous for this purpose.

Moreover, the control unit can be designed as a safety monitoring unit for the elevator system. In this case, the control unit acting as the safety monitoring unit can monitor operating parameters of the elevator system that are relevant for safety using the sensor signals transmitted by the field devices and/or can implement operating states that are relevant for safety using the actuators actuated by the control signals.

At least some of the field devices may for example be door switches for monitoring a closure state of doors of the elevator system in each case. In this case, the field devices can form "intelligent" door switches for example. For example, each field device may be designed to insert the data thereof representing the closure state at a position within the data packet that is provided individually for said field device. Furthermore, the field device may be designed not only to distinguish between two states, specifically "door open" and "door closed", but in addition to be able to transfer further information and signals to the control unit, for example in respect of its identity and/or its operating state and/or any malfunctions that may exist.

It is noted that some of the possible features and advantages of the invention are described herein with reference to different embodiments. A person skilled in the art shall recognize that the features may be combined, adapted, or exchanged as appropriate in order to arrive at other embodiments of the invention.

Embodiments of the invention are described in the following with reference to the accompanying drawings, neither the drawings nor the description being intended to be interpreted as limiting to the invention.

The drawings are merely schematic and not true to scale. Like reference signs refer in different drawings to like or analogous features.

DETAILED DESCRIPTION

Figure 1:
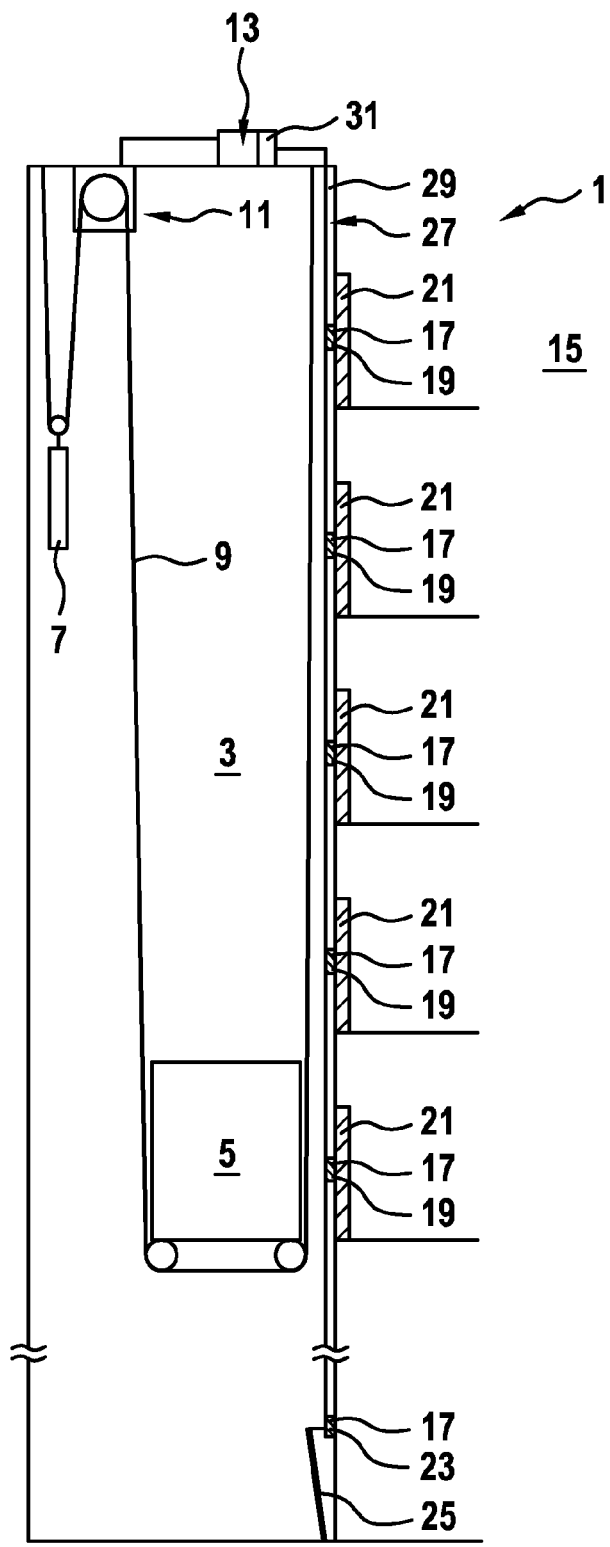
FIG. 1 shows an elevator system according to an embodiment of the present invention.

FIG. 1 shows an elevator system 1 according to the invention. The elevator system 1 comprises an elevator shaft 3, in which an elevator car 5 and a counterweight 7 can be moved. For this purpose, the elevator car 5 and the counterweight 7 are retained on a rope-like or belt-like bearing means 9 that can be moved by a drive motor 11. A function of the elevator system 1 and in particular operation of the drive motor 11 can be controlled using a central control unit 13.

In order to be able to ensure correct functioning and in particular safety of the elevator system 1, a plurality of field devices 17 are accommodated in a structure 15 that accommodates the elevator system 1. In this case, the field devices 17 are arranged in a distributed manner over the structure 15. The field device 17 may for example be door switches 19 that can monitor a closure state of doors 21, in particular of floor doors, of the elevator system 1. A ladder 25 may furthermore be mounted close to a floor or a pit of the elevator shaft 3 for example, the correct, neat storage of which on a side wall of the elevator shaft 3 is monitored for example using a monitoring switch 23 acting as a field device 17. The field devices 17 may be part of a safety circuit 27 of the elevator system 1 and may be connected to the central control unit 13 or in particular to a safety monitoring unit 31 integrated there for example, by means of series cabling 29 for example.

Each of the field devices 17 is set up to output sensor signals generated by a sensor and/or to receive control signals to be implemented by an actuator. In this case, a field device 17 may for example itself comprise a senor and/or an actuator and output the sensor signals generated by the sensor to other devices, in particular to the central control unit, via external terminals, or may convey to the actuator control signals received from other devices, in particular the central control unit 13, via such external terminals, in order that said actuator can implement the control commands contained therein. Alternatively, a field device 17 may function merely as a node that can for example receive sensor signals from an external sensor or from another field device and then output said signals to further devices, or that can receive control signals from further devices and then pass said signals to an external actuator in order that said actuator can implement the control signals.

FIGS. 2 to 5 show a safety monitoring unit 31 as part of a central control unit 13, and a plurality of field devices 17a, 17b, 17c, 17d electrically connected to said safety monitoring unit, in different embodiments for use in an elevator system 1 according to the invention. The field devices 17a, 17b, 17c, 17d are shown merely schematically in this case.

Each field device 17a, 17b, 17c, 17d comprises a driver 33, 33', by means of which the signals of said field device can be inserted into or removed from a data packet supplied to the field device 17a, 17b, 17c, 17d. In other words, using the driver 33, a data packet that has reached a field device 17 can be supplemented by sensor signals generated by a sensor for example, or, additionally or alternatively, control signals to be implemented by an actuator can be removed from the data packet. In this case, a driver 33, 33' is typically designed so as to be able to receive the data packet from one direction and can then introduce the signals into the data packet and then output said signals in another direction. This is shown in the drawings by the arrow provided for the drivers 33, 33'.

Each field device 17a, 17b, 17c, 17d comprises at least four terminals that can preferably be contacted from the outside, i.e. a first terminal 51a, 51b, 51c, 51d, a second terminal 52a, 52b, 52c, 52d, a third terminal 53a, 53b, 53c, 53d, and a fourth terminal 54a, 54b, 54c, 54d. Two of the terminals 51a, 51b, 51c, 51d-54a, 54b, 54c, 54d in each case can be combined to terminal pairs. Data packets can be transmitted to or passed on from the field device 17 via said terminals.

At least one of said terminals is electrically connected to the driver 33, 33' such that data packets can be received therefrom, whereas at least one other of the terminals is electrically connected to the driver 33, 33' such that the driver 33, 33' can forward said data packet externally via said terminal.

Figure 2:
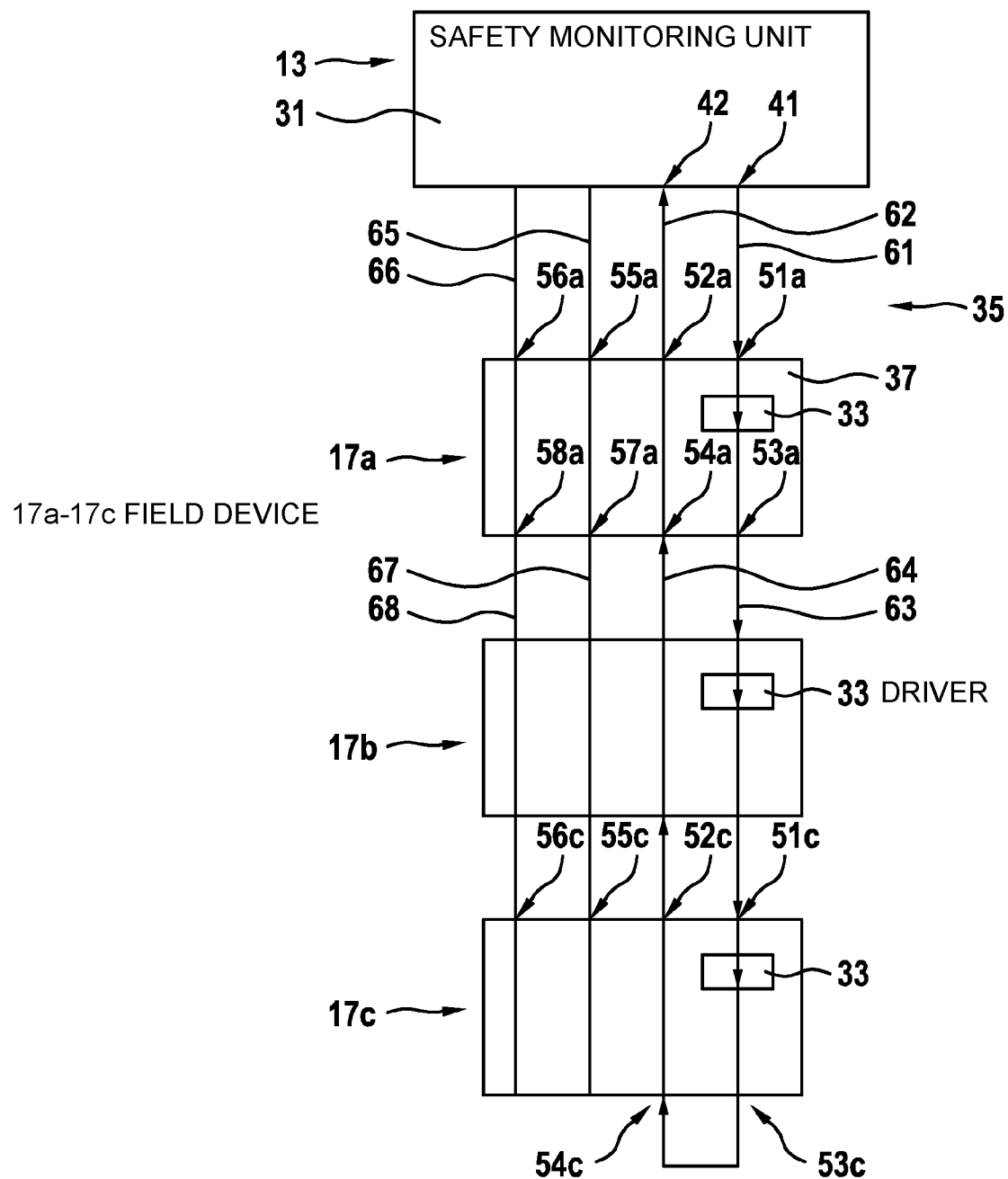
FIG. 2 shows components of an elevator system according to the invention comprising a field bus system designed having a closed ring topology.

In the embodiment shown in FIG. 2, three field devices 17a, 17b, 17c are connected to the central control unit 13 by way of example. A field bus system 35 is provided for this purpose, which field bus system has a topology of electrical lines 61, 62, 63, 64 for interchanging sensor signals and/or control signals between the central control unit 13 and the field devices 17a, 17b, 17c. In this case, the field devices 17a, 17b, 17c, the central control unit 13 and the field bus system 35 are designed to be able to interchange a data packet comprising the sensor signals and/or control signals in a serial manner between the central control unit 13 and all field devices 17a, 17b, 17c in a summation frame method using a ring topology.

In other words, both the field devices 17a, 17b, 17c, including the internal wiring thereof, and the lines 61, 62, 63, 64 of the field bus system are designed such that a data packet originating from the central control unit 13 is guided in a serial manner successively through all the field devices 17a, 17b, 17c, and sensor signals can in each case be inserted into the data packet or control signals can be removed from the data packet in the relevant drivers 33 of one of the field devices 17a, 17b, 17c, before the data packet is then finally guided back to the control unit 13 on account of the closed ring topology.

In the embodiment shown in FIG. 2, the closed ring topology is implemented such that the first terminal 51a of a field device 17a closest to the central control unit 13 is connected to a terminal 41 of the control unit 13 via a first electrical connection 61. The driver 33 that is electrically connected to said first terminal 51a can thus receive and optionally modify a data packet from the control unit 13 in order to then forward said data packet to the third terminal 53a of the field device 17a. From there, said data packet can be forwarded via a further electrical line 63 to the adjacent field device 17b, from where it is forwarded in a similar manner to a field device 17c arranged furthest from the control unit 13. A third terminal 53c of said remotest field device 17c is then connected to a fourth terminal 54c of said field device 17c via an electrical loopback connection. Since, in this embodiment, the fourth terminals 54a, 54b, 54c and the second terminals 52a, 52b, 52c of all the field devices 17a, 17b, 17c are interconnected for direct feedthrough, and are connected between adjacent field devices 17a, 17b, 17c by means of corresponding electrical lines, the ring topology is thus closed as far as the central control unit 13.

The specific design of the field devices 17a, 17b, 17c and of the field bus system 35 in a closed ring topology, and the use of the summation frame method for transferring data packets through said ring topology from one field device 17a, 17b, 17c to the next makes it possible to achieve rapid and secure data transmission from each of the field devices 17a, 17b, 17c to the central control unit 13 and vice versa.

Providing a field bus system further allows mutually adjacent field devices 17a, 17b, 17c to be electrically interconnected in a very simple manner. In particular, simple multipole cable connections can be used to create the electrical connections 61, 62, 63, 64. For example, a bipolar cable can form a connection between the first and second terminals 51a, 52a of the field device 17a and the terminals 41, 42 of the control unit 13. A bipolar cable that is fundamentally identically formed can also form the electrical connections 63, 64 between the third and fourth terminals 53a, 54a of the first field device 17a and the first and second terminals 51b, 52b of the adjacent second field device 17b. Overall, in this way all the field devices 17a, 17b, 17c can be interconnected by means of simple multipole cables and optionally plug-in connectors that are attached to the cable ends and are identical in each case.

Optionally, four further terminals may be provided on each of the field devices 17a, 17b, 17c, via which further terminals electrical lines 65, 66, 67, 68 for supplying power can be connected to the field devices 17a, 17b, 17c. In this case, simple 4-pole cables can interconnect adjacent field devices 17a, 17b, 17c. For example, plug-in connectors comprising four mating terminals that correspond to the associated terminals 51a, 51c; 52a, 52c; 55a, 55c; 56a, 56c; or the associated terminals 53a, 54a, 57a, 58a may be provided at the ends of 4-pole cables of this kind.

However, in the case of the embodiment shown in FIG. 2, a problem may arise in that a data packet that has been processed in the field device 17c located furthest from the central control unit 13 has to follow a relatively long path back to the central control unit 13. In particular in applications in elevator systems 1 for tall buildings, in which for example door switches 19 are arranged in a distributed manner on a plurality of floor doors 21 along the elevator shaft 3 over several meters or even over hundreds of meters, such data packet retransmission from the remotest field device 17c to the central control unit 13 may occur via a relatively long line. In particular, such data packet transfer places higher requirements on the connection lines and on the temporal behavior than data packet transfer between directly adjacent field devices 17a, 17b, 17c on an outbound path to the remotest field device 17c. Since data transmission within the field bus system 35 generally has to be uniformly clocked, a single instance of data packet retransmission from the remotest field device 17c that requires such a long time can slow an overall data transmission rate within the field bus system.

Figure 3:
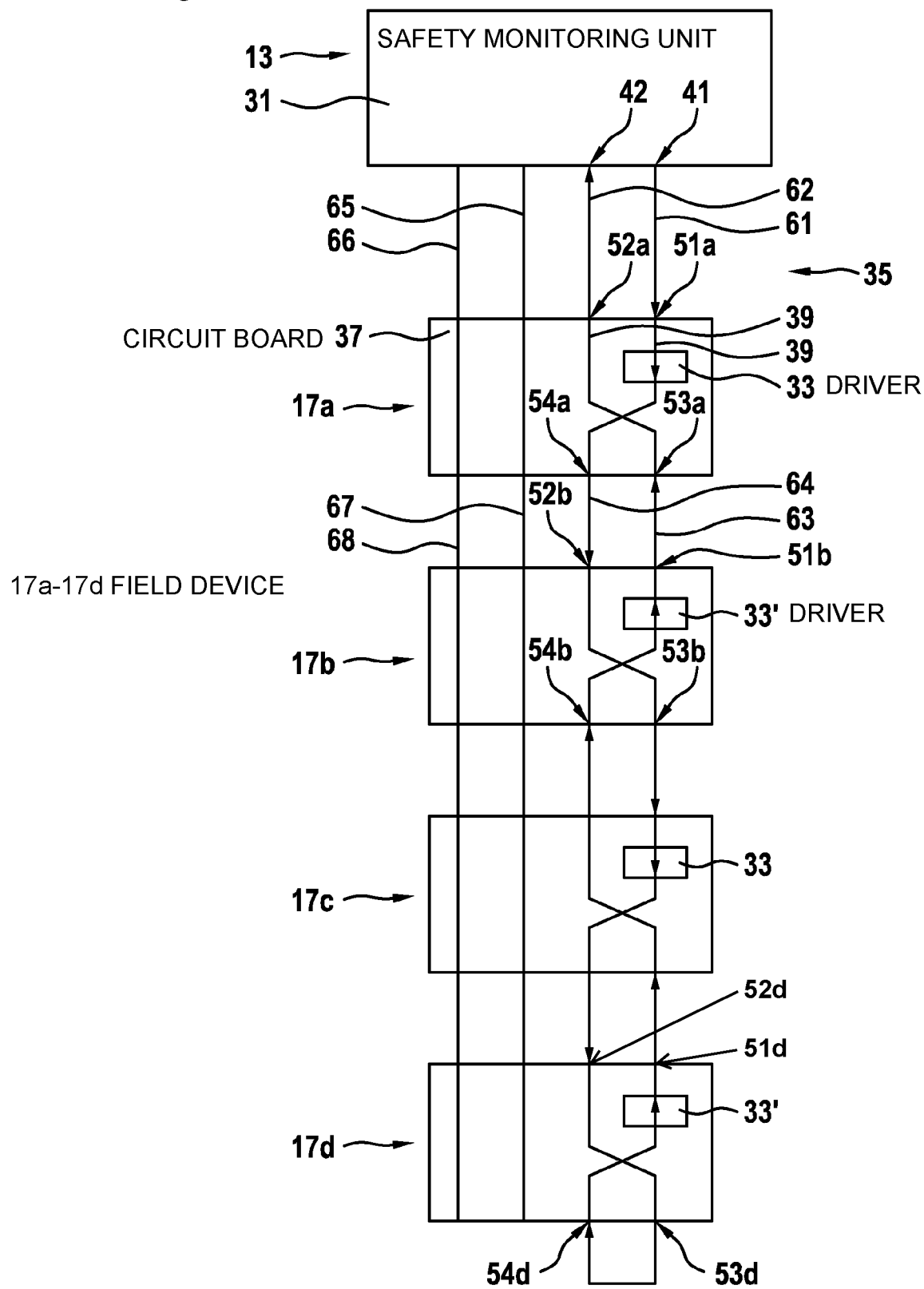
FIGS. 3 and 4 each show components of an elevator system according to the invention comprising a field bus system having a ring topology, in which field devices are divided into a first and a second group and interlaced cable routing is provided inside the field devices.
Figure 4:
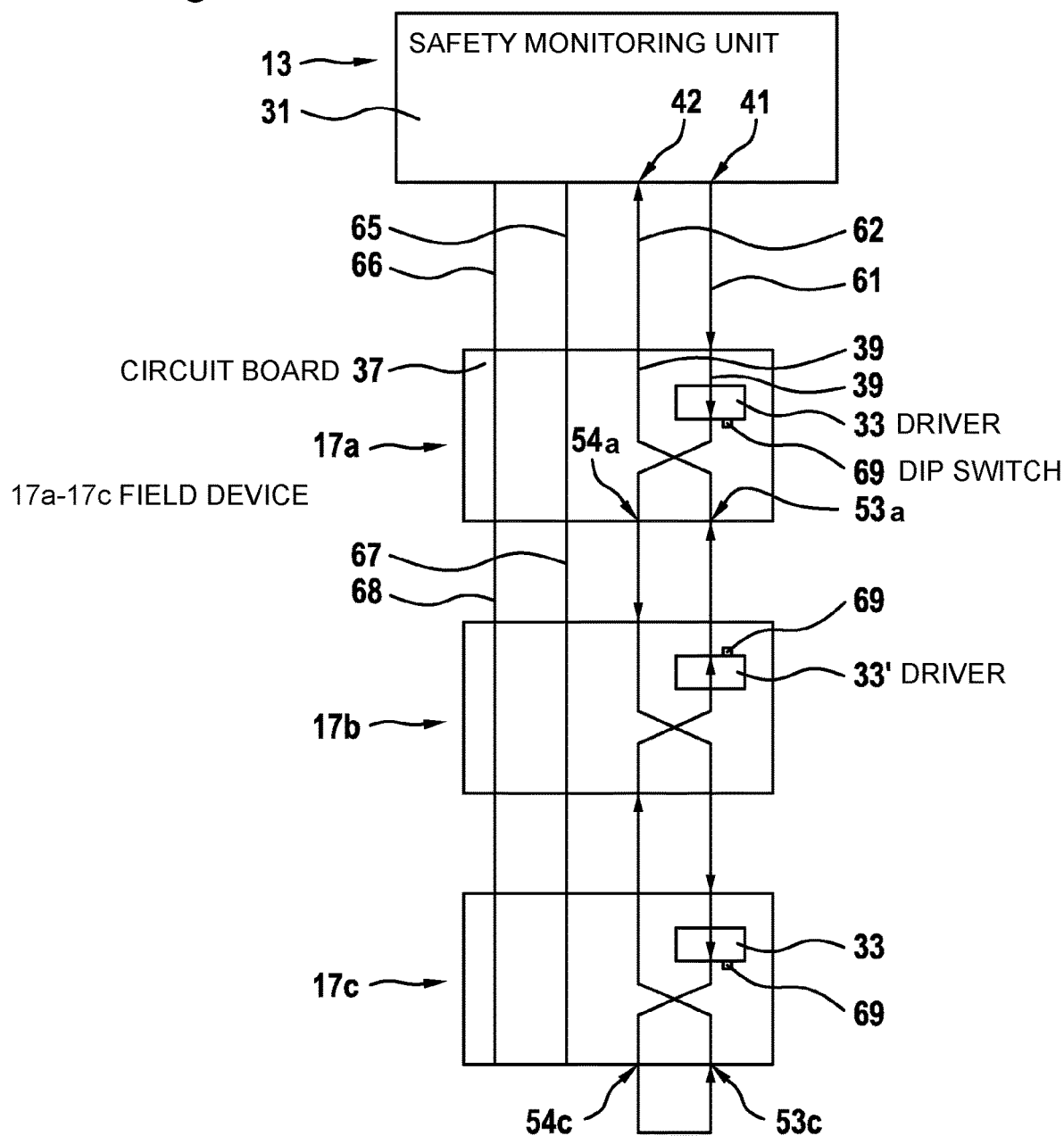
Figure 5:
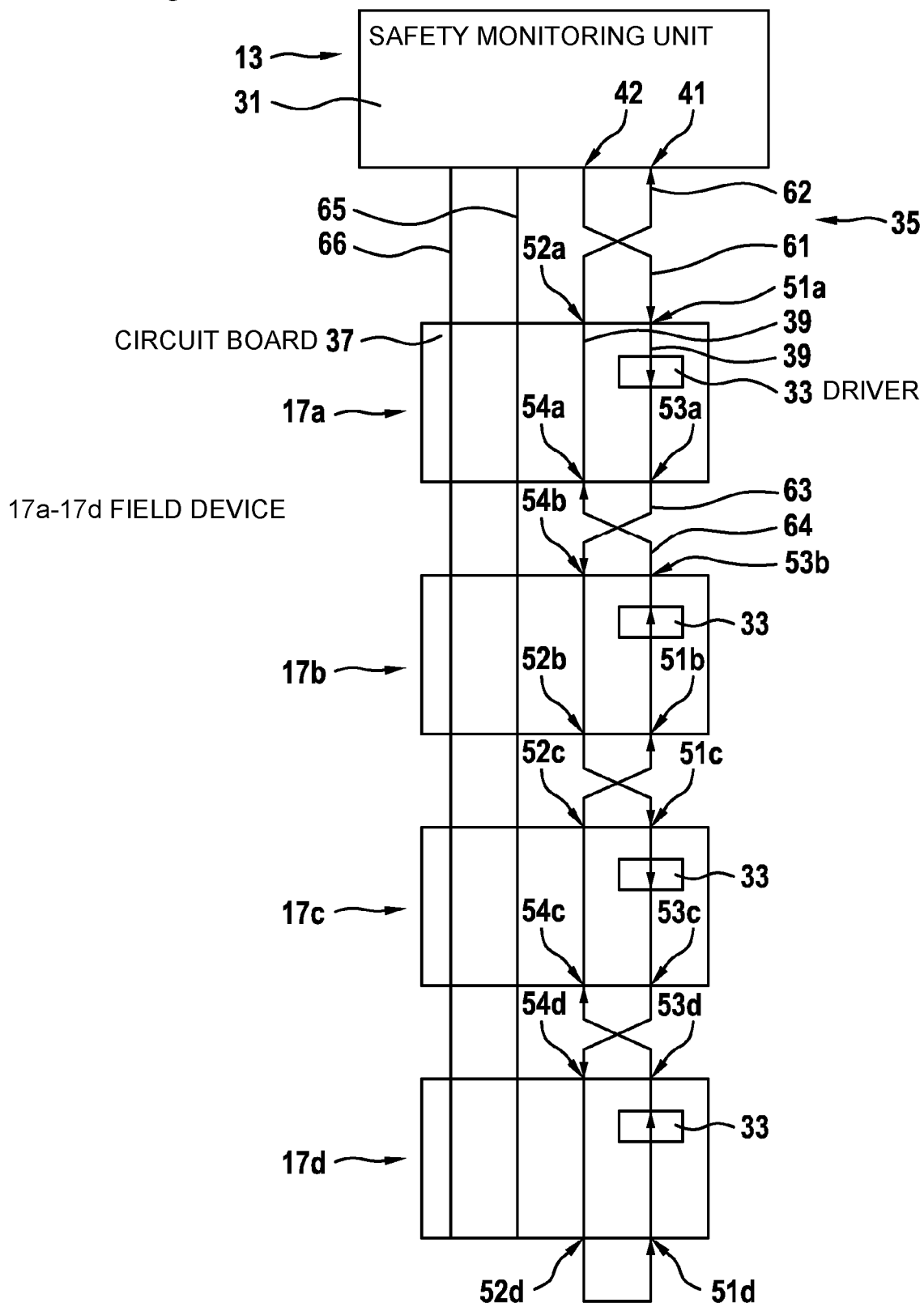
FIG. 5 shows components of an elevator system according to the invention comprising a field bus system having a ring topology, in which field devices are divided into a first and a second group and interlaced cable routing is provided between adjacent devices.

For this reason, alternative closed ring topologies are proposed, as are shown by way of example in FIGS. 3 to 5.

In the embodiments shown in FIGS. 3 and 4, similarly to the embodiment in FIG. 2, a plurality of field devices 17a, 17b, 17c, 17d are arranged one behind the other in a sequence. In this case, the embodiments in FIGS. 3 and 4 differ mainly in respect of the number of field devices, FIG. 3 depicting, by way of example, an even number of field devices, an FIG. 4 an odd number of field devices.

However, in contrast to the embodiment from FIG. 2, in this case not all the field devices 17a, 17b, 17c, 17d are designed identically and electrically interconnected. Instead, the field devices 17a, 17b, 17c, 17d may be considered to be divided into two groups. In a first group, which comprises the field devices 17a and 17c in the examples, on an outbound path of the ring topology, from the control unit 13 as far as a field device 17d in FIGS. 3 and 17c in FIG. 4 that is arranged furthest from the control unit 13, the field devices 17a, 17c are incorporated into the ring topology such that the data packet is supplied to the drivers 33 thereof. A second group of field devices 17b (and also 17d in FIG. 3) is incorporated into a return path of the ring topology, from the field device 17d or 17c arranged furthest from the control unit 13, to the control unit 13, such that the data packet is supplied to the drivers 33' thereof only on said return path. In this case, considered spatially, the first group of field devices comprises every second field device 17a, 17c on the outbound path of the ring topology from the control unit 13 to the field device 17d or 17c arranged furthest from said control unit 13, whereas the second group comprises the remaining field devices 17b (and optionally 17d) on the return path of the ring topology. As a result, one field device 17b incorporated in the return path of the ring topology is accommodated in each case between two field devices 17a, 17c incorporated in the outbound path of the ring topology.

In this case, in the embodiments shown in FIGS. 3 and 4, a type of crossing or interlacing occurs between the first and second terminal of the field device 17a, 17b, 17c, 17d and between the third and the fourth terminal of the field device. In this case, the field devices 17a, 17c of the first group are designed such that the driver 33 thereof can receive the data packet via the first terminal, e.g. 51a, and can output the data packet again via the fourth terminal, e.g. 54a. In this case, the field devices 17b, 17d of the second group are designed such that the driver thereof can receive the data packet via the fourth terminal, e.g. 54b, and can output the data packet again via the first terminal, e.g. 51b. In other words, in the field devices 17a, 17c of the first group, data transmission via the driver 33 occurs exactly in an opposite direction than is the case in the field devices 17b, 17d of the second group via its drivers 33'.

The second and third terminals 52a, 52b, 52c, 52d; 53a, 53b, 53c, 53d that are not electrically connected to the drivers 33, 33' are interconnected for direct feedthrough, such that data packets can be transferred here between the second and third terminals without needing to be modified by a driver 33, 33'.

Crossing or interlacing of signal lines between the first and second terminals 51a, 51b, 51c, 51d, 52a, 52b, 52c, 52d and between the third and fourth terminals 53a, 53b, 53c, 53d, 54a, 54b, 54c, 54d of a field device 17a, 17b, 17c, 17d can be implemented within the field device 17a, 17b, 17c, 17d. In this case, the field devices 17a, 17c of the first group that are to be connected on the outbound path of the ring topology may differ in respect of internal wiring, in respect of a data transmission direction in which the drivers 33, 33' thereof can move data between the terminals, and/or in respect of a geometrical design and/or arrangement of the four contacts 51a, 51b, 51c, 51d; 52a, 52b, 52c, 52d; 53a, 53b, 53c, 53d; 54a, 54b, 54c, 54d. For example, the drivers 33, 33' may be provided in each case on circuit boards 37, and terminals of the drivers 33, 33' may be electrically connected with the externally accessible terminals 51a, 51b, 51c, 51d; 52a, 52b, 52c, 52d; 53a, 53b, 53c, 53d; 54a, 54b, 54c, 54d of the field devices 17a, 17b, 17c, 17d using conductive tracks 39 provided on the circuit board 37.

In order not to have to produce and store a plurality of different types of field devices 17 for the two groups of field devices, it is possible to form the data transmission direction of a driver 33 so as to be modifiable, for example using switches, in particular DIP switches 69 (shown in FIG. 4 merely by way of example), and appropriately designed wiring.

In this case, an embodiment of the wiring or lines 61-68 electrically interconnecting the adjacent field devices 17a, 17b, 17c, 17d may be designed identically for all the field devices 17a, 17b, 17c, 17d. With the exception of the first and the last field device 17a, 17c (or 17d), in the case of each field device 17b, 17c in FIG. 3 the first and second terminal 51b, 51c in FIG. 3, 52b, 52c in FIG. 3, is connected to the third and fourth terminal 53a, 53b in FIG. 3; 54a, 54b in FIG. 3 of the adjacent field device 17a, 17b in FIG. 3, and the third and fourth terminal 53b, 53c in FIG. 3, 54b, 54c in FIG. 3 is connected to the first and second terminal 51c, 51d in FIG. 3 of the field device 17c, 17d in FIG. 3 that is adjacent on the other side. The first terminal 51a of the first field device 17a is connected to the terminal 41 of the control unit 13, and the second terminal 52a of the first field device 17a is connected to the terminal 42 of the control unit 13. The third terminal 53d, 53c in FIG. 3 of the last field device 17d, 17c in FIG. 3 is connected to the fourth terminal 54d, 54c thereof in FIG. 3.

In order to construct the ring topology, all the field devices 17a, 17b, 17c, 17d of the two groups can thus be interconnected using homogenous multipole cables. This can significantly simplify cabling of a plurality of field devices 17a, 17b, 17c, 17d and can prevent errors in such cabling.

FIG. 5 shows an alternative embodiment of a plurality of field devices 17a, 17b, 17c, 17d designed having a ring topology, together with a central control unit 13. In this embodiment, similarly to the embodiment shown in FIG. 2, all the field devices 17a, 17b, 17c, 17d may be designed identically, but incorporated into the ring topology of the field bus system in different manners, in particular having different data transmission directions. Moreover, here, too, only every second field device 17a, 17c is incorporated into the ring topology on the outbound path, while every second other field device 17b, 17d is incorporated on the return path of said ring topology.

Interlacing of the signal lines, required therefor, does not, however, occur inside the field devices 17a, 17b, 17c, 17d as is the case in the embodiments shown in FIGS. 3 and 4. Instead, such interlaced or crossed cable routing occurs in the wiring or connections 61-64 interconnecting adjacent field devices 17a, 17b, 17c, 17d. In this case, every second field device 17a, 17b, 17c, 17d is incorporated into the ring topology in a manner "mirrored" about a horizontal axis.

Preferably multipole cables are used here too, in order to interconnect adjacent field devices 17a, 17b, 17c, 17d. However, at least the lines 63, 64 that connect the third and the fourth terminal 53a, 53c; 54a, 54c of one field device 17a, 17c to the third and fourth terminal 53b, 53d; 54b, 54d of an adjacent field device 17b, 17d are not continuously straight, but instead interlaced once. In other words, the third terminal 53a, 53c of one field device 17a, 17c is not connected to the third terminal 53b, 53d of the adjacent field device 17b, 17d, and the fourth terminal 54a, 54c is not connected to the fourth terminal 54b, 54d of the adjacent field device 17b, 17d, but instead, following interlacing of the lines 63, 64 provided therefor, the third terminal 53a, 53c of one field device 17a, 17c is connected to the fourth terminal 54b, 54d of the adjacent field device 17b, 17d, and the fourth terminal 54a, 54c of one field device 17a, 17c is connected to the third terminal 53b, 53d of the adjacent field device 17b, 17d.

In addition, the first terminal 51b of one field device 17b is connected to the second terminal 52c of the adjacent field device 17c, and the second terminal 52b of one field device 17b is connected to the first terminal 51c of the adjacent field device 17c, following interlacing of the lines provided therefor.

The first terminal 51a of the first field device 17a is connected to the terminal 42 of the control unit 13, and the second terminal 52a of the first field device 17a is connected to the terminal 41 of the control unit 13. The lines 61 and 62 are also crossed for this purpose. The first terminal 51d of the last field device 17d is connected to the second terminal 52d thereof.

The embodiment shown in FIG. 5 may be advantageous in that all the field devices 17a, 17b, 17c, 17d can be designed identically. However, it is then necessary to take care, when cabling adjacent field devices 17a, 17b, 17c, 17d, that correct interlacing of the lines 63, 64 is carried out, i.e. in practice that for example connectors are placed on correctly and/or that a suitably interlaced multipole cable type is to be used correctly.

Finally, it should be noted that terms such as "comprising", "having" etc. do not preclude other elements or steps and terms such as "a/an" or "one" do not preclude a plurality. It should also be noted that features that have been described with reference to one of the above embodiments may also be used in combination with other features of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS 1 elevator system
3 elevator shaft
5 elevator car
7 counterweight
9 bearing means
11 drive motor
13 central control unit
15 structure
17 field device (17a-d)
19 door switch
21 floor door
23 monitoring switch
25 ladder
27 safety circuit
29 cabling
31 safety monitoring unit
33 driver
33' inverse driver
35 field bus system
37 circuit board
39 conductive track
41 first terminal of the control unit
42 second terminal of the control unit
51a-d first terminal of the field device
52a-d second terminal of the field device
53a-d third terminal of the field device
54a-d fourth terminal of the field device
55a, c further terminal of the field device
56a, c further terminal of the field device
57a further terminal of the field device
58a further terminal of the field device
61-68 electrical lines
69 DIP switch

The invention claimed is:
1. An elevator system comprising:
a central control unit for at least one of generating control signals and processing sensor signals, and for controlling functions of the elevator system;
a plurality of field devices distributed inside a structure accommodating the elevator system, wherein each of the field devices at least one of outputs the sensor signals generated by a sensor and receives the control signals to be implemented by an associated actuator;
a field bus system having a topology of electrical lines connected to the central control unit and the field devices for interchanging at least one of the sensor signals and the control signals between the central control unit and the field devices;
wherein the field devices, the central control unit and the field bus system interchange a data packet comprising at least one of the sensor signals and the control signals in a serial manner between the central control unit and all of the field devices in a summation frame method using a closed ring topology;
wherein each of the field devices includes a driver for inserting the sensor signals into the data packet or for removing the control signals from the data packet;
wherein the field devices are connected in a sequence and are divided into a first group comprising at least one of the field devices and a second group comprising at least another one of the field devices;
wherein the ring topology has an outbound path from the control unit as far as a one of the field devices arranged furthest from the control unit and only the field devices of the first group are incorporated into the outbound path such that the data packet is supplied to the drivers of the field devices of the first group;
wherein the field devices of the second group are incorporated into a return path of the ring topology from the control unit as far as the one of the field devices that is arranged furthest from the control unit such that the data packet is supplied to the drivers of the field devices of the second group; and wherein the first group of the field devices comprises only every second one of the field devices in the sequence from the control unit to the one of the field devices arranged furthest from the control unit.

2. The elevator system according to claim 1 further comprising:

each of the field devices has first, second, third, and fourth terminals;

wherein each of the field devices has the driver electrically connected to the first terminal and to the fourth terminal, and the second terminal is electrically connected to the third terminal for direct feedthrough of the data packet;

wherein, in each of the field devices of the first group, the driver receives the data packet via the first terminal and outputs the data packet via the fourth terminal;

wherein, in each of the field devices of the second group, the driver receives the data packet via the fourth terminal and outputs the data packet via the first terminal;

wherein the first terminal and the second terminal of a one of the field devices closest to the control unit are connected to terminals of the control unit;

wherein, in each of the field devices with exception of the one of the field devices arranged furthest from the control unit, the third terminal is electrically connected to the first terminal of a directly adjacent one of the field devices in the sequence, and the fourth terminal is electrically connected to the second terminal of the directly adjacent field device; and wherein, in the field device arranged furthest from the control unit, the third electrical is connected to the fourth terminal in an electrically shorting manner.

3. The elevator system according to claim 2 wherein at least one of the drivers and an arrangement of the drivers of the field devices of the first group differ from at least one of the drivers and an arrangement of the drivers of the field devices of the second group.

4. The elevator system according to claim 2 wherein the field devices can be selectively adjusted to reverse a data transmission direction of the drivers.

5. The elevator system according to claim 4 wherein the field devices include switches for selectively adjusting the data transmission direction of the drivers.

6. The elevator system according to claim 1 further comprising:

each of the field devices has first, second, third and fourth electrical terminals;

wherein, both in the field devices of the first group and in the field devices of the second group, the drivers are electrically connected to the first terminal and to the third terminal to receive the data packet via the first terminal and to output the data packet via the third terminal, and the second terminal is electrically connected to the fourth terminal for direct feedthrough of the data packet wherein the first terminal and the second terminal of a one of the field devices closest to the control unit are connected to terminals of the control unit; and wherein each of the field devices of the first group is connected to an adjacent one of the field devices of the second group by, the third terminal of the field device of the first group being connected to the fourth terminal of the adjacent field device of the second group and fourth terminal of the field device of the first group being connected to the third terminal of the adjacent field device of the second group, or the first terminal of the field device of the first group being connected to the second terminal of the adjacent field device of the second group and the second terminal of the field device of the first group being connected to the first terminal of the adjacent field device of the second group.

7. The elevator system according to claim 6 wherein the field devices of the first group and the field devices of the second group are identical.

8. The elevator system according to claim 1 wherein the field devices form parts of a safety circuit of the elevator system.

9. The elevator system according to claim 1 wherein the central control unit is a safety monitoring unit for the elevator system.

10. The elevator system according to claim 1 wherein at least some of the field devices are door switches for monitoring a closure state of doors of the elevator system.

11. The elevator system according to claim 1 wherein a one of the field devices that outputs the sensor signals from the sensor either provides the sensor signals or inserts the sensor signals into the data packet whereby the sensor signals identify the sensor.

12. The elevator system according to claim 1 wherein a one of the field devices that receives the control signals to be implemented by the associated actuator receives and evaluates the control signals from the data packet whereby the control signals identify the associated actuator.

13. The elevator system according to claim 1 wherein at least one of the field devices generates further signals, in addition to the sensor signals, or receives and evaluates further signals in addition to the control signals.

14. The elevator system according to claim 1 wherein the driver of at least one of the field devices is provided on a circuit board, and wherein the first, second, third and fourth terminals are electrically connected to the driver by conductive tracks on the circuit board.

* * * * *